United States Patent
Liu et al.

(10) Patent No.: US 9,756,637 B2
(45) Date of Patent: Sep. 5, 2017

(54) RESOURCE ALLOCATION IN A RADIO COMMUNICATION NETWORK

(71) Applicant: Telefonaktiebolaget L M Ericsson (publ), Stockholm (SE)

(72) Inventors: Jinhua Liu, Beijing (CN); Muhammad Kazmi, Bromma (SE); Zhan Zhang, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 11 days.

(21) Appl. No.: 14/762,283

(22) PCT Filed: Jan. 23, 2013

(86) PCT No.: PCT/CN2013/070897
§ 371 (c)(1),
(2) Date: Jul. 21, 2015

(87) PCT Pub. No.: WO2014/113941
PCT Pub. Date: Jul. 31, 2014

(65) Prior Publication Data
US 2015/0365941 A1    Dec. 17, 2015

(51) Int. Cl.
*H04W 4/00*     (2009.01)
*H04W 72/04*    (2009.01)
(Continued)

(52) U.S. Cl.
CPC .......... *H04W 72/0446* (2013.01); *H04L 5/14* (2013.01); *H04W 72/06* (2013.01); *H04W 72/10* (2013.01); *H04W 72/12* (2013.01); *H04W 88/02* (2013.01)

(58) Field of Classification Search
None
See application file for complete search history.

(56) References Cited

U.S. PATENT DOCUMENTS

| 2011/0149813 A1 | 6/2011 | Parkvall et al. | |
| 2013/0343336 A1* | 12/2013 | Bai | H04W 72/082 370/329 |

(Continued)

FOREIGN PATENT DOCUMENTS

| CN | WO 2012116639 A1 * | 9/2012 | H04W 72/082 |
| CN | 102740477 | 10/2012 | |

(Continued)

OTHER PUBLICATIONS

Extended European Search Report/Supplementary European Search Report/European Search Opinion for Application No./U.S. Pat. No. 13872398.6-1857 / 2949166 PCT/CN2013070897—Aug. 9, 2016.

(Continued)

Primary Examiner — Jutai Kao
(74) Attorney, Agent, or Firm — Baker Botts, LLP

(57) ABSTRACT

The present disclosure introduces allocation of resources to one or more UEs based on a determined allocation priority and/or allocation probability in, e.g., Time Division Duplex (TDD) based radio communication networks. The disclosed technology provides the ability for a subframe to be configured as a "flexible" subframe, which can be dynamically allocated as either a downlink subframe or an uplink subframe. For each "flexible" subframe, an allocation priority and/or allocation probability is determined and subsequent resource allocation to user equipments (UEs) can be based on the determined allocation priority and/or allocation probability. Hereby, it is made possible to reduce interference in, e.g., TDD based radio communication networks.

16 Claims, 6 Drawing Sheets

(51) Int. Cl.
*H04W 72/06* (2009.01)
*H04L 5/14* (2006.01)
*H04W 72/10* (2009.01)
*H04W 72/12* (2009.01)
*H04W 88/02* (2009.01)

(56) References Cited

U.S. PATENT DOCUMENTS

| | | | |
|---|---|---|---|
| 2014/0022966 A1* | 1/2014 | Parkvall | H04B 7/2656 370/280 |
| 2014/0029486 A1 | 1/2014 | Li et al. | |
| 2014/0051379 A1* | 2/2014 | Ganesh | H04M 1/72538 455/404.1 |
| 2017/0111928 A1* | 4/2017 | Song | H04W 72/14 |

FOREIGN PATENT DOCUMENTS

| | | |
|---|---|---|
| WO | WO 2011/077288 | 6/2011 |
| WO | WO 2012/064244 | 5/2012 |
| WO | WO 2012130179 | 10/2012 |

OTHER PUBLICATIONS

3GPP TSG RAN WG1 Meeting #72; St. Julian's, Malta; Source: Huawei, HiSilicon; Title: Interference mitigation schemes for TDD eIMTA (R1-130015)—Jan. 28-Feb. 1, 2013.

PCT Notification of Transmittal of the International Search Report and the Written Opinion of the International Searching Authority, or the Declaration for International application No. PCT/CN2013/070897, Oct. 31, 2013.

3GPP TR 36.828 V2.0.0; 3rd Generation Partnership Project; Technical Specification Group Radio Access Network; Further Enhancements to LTE TDD for DL-UL Interference Management and Traffic Adaptation (Release 11), Jun. 2012.

LTE evolution for Hotspot and Indoor (LTE-Hi); CATR, MIIT, May 2012.

* cited by examiner

RESOURCE ALLOCATION IN A RADIO COMMUNICATION NETWORK

PRIORITY

This nonprovisional application is a U.S. National Stage Filing under 35 U.S.C. §371 of International Patent Application Serial No. PCT/CN2013/070897, filed Jan. 23, 2013, and entitled "RESOURCE ALLOCATION IN A RADIO COMMUNICATION NETWORK."

TECHNICAL FIELD

The technology presented in this disclosure generally relate to radio communication networks, particularly (though not exclusively) radio communication networks using Time Division Duplex (TDD), for example Long-Term Evolution (LTE) TDD. More particularly, the present disclosure relates to the allocation of resources based on an allocation priority and/or an allocation probability.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

In a typical cellular radio system, user equipments (UEs) can communicate via a radio access network (RAN) to one or more core networks (CN). The RAN generally covers a geographical area which is divided into radio cell areas. Each radio cell area can be served by a base station, e.g., a radio base station (RBS), which in some networks may also be called, for example, a "NodeB" (UMTS) or "eNodeB" (LTE). A radio cell is a geographical area where radio coverage is generally provided by the radio base station at a base station site. Each radio cell can be identified by an identity within the local radio area, which is broadcast in the radio cell. The base stations communicate over the air interface operating on radio frequencies with the UEs within range of the base stations. In some radio access networks, several base stations may be connected (for example, by landlines or microwave) to a radio network controller (RNC) or a base station controller (BSC). The radio network controller may be configured to supervise and coordinate the various activities of the plurality of base stations connected thereto. The radio network controllers may also be connected to one or more core networks.

The Universal Mobile Telecommunications System (UMTS) is a third generation mobile communication system, which evolved from the Global System for Mobile Communications (GSM). The Universal Terrestrial Radio Access Network (UTRAN) is essentially a radio access network using Wideband Code Division Multiple Access (WCDMA) for UEs. As an alternative to WCDMA, Time Division Synchronous Code Division Multiple Access (TD-SCDMA) could be used. In a standardization forum known as the Third Generation Partnership Project (3GPP), telecommunications suppliers propose and agree upon standards for third generation networks and UTRAN specifically, and investigate e.g. enhanced data rate and radio capacity. The 3GPP has undertaken to evolve the UTRAN and GSM based radio access network technologies. The first releases for the Evolved Universal Terrestrial Radio Access Network (E-UTRAN) specification have been issued. The Evolved Universal Terrestrial Radio Access Network (E-UTRAN) comprises the Long Term Evolution (LTE) and System Architecture Evolution (SAE). Long Term Evolution (LTE) is a variant of a 3 GPP radio access technology where the radio base station nodes are connected to a core network (e.g., via Access Gateways (AGWs)) rather than to radio network controller (RNC) nodes. In general, in LTE the functions of a radio network controller (RNC) node are distributed between the radio base stations nodes (eNodeB's in LTE) and AGWs. As such, the radio access network (RAN) of an LTE system has what is sometimes referred to as a "flat" architecture including radio base station nodes without reporting to radio network controller (RNC) nodes.

Transmission and reception from a node, e.g., a radio terminal like a UE in a cellular system such as LTE, can be multiplexed in the frequency domain or in the time domain (or combinations thereof). In Frequency Division Duplex (FDD), downlink (DL) and uplink (UL) transmission take place in different, sufficiently separated, frequency bands. In Time Division Duplex (TDD), DL and UL transmission take place in different, non-overlapping time slots. Thus, TDD can operate in unpaired frequency spectrum, whereas FDD generally requires paired frequency spectrum.

Typically, a transmitted signal in a radio communication system is organized in some form of frame structure, or frame configuration. For example, LTE generally uses ten equally sized subframes 0-9 of length 1 ms per radio frame as illustrated in FIG. 1. In case of TDD as shown in FIG. 1, there is generally only a single carrier frequency, and UL and DL transmissions are separated in time. Because the same carrier frequency is used for uplink and downlink transmission, both the base station and the UEs need to switch from transmission to reception and vice versa. An important aspect of a TDD system is to provide a sufficiently large guard time where neither DL nor UL transmissions occur in order to avoid interference between UL and DL transmissions. For LTE, special subframes (e.g., subframe #1 and, in some cases, subframe #6) provide this guard time. A TDD special subframe is generally split into three parts: a downlink part (DwPTS), a guard period (GP), and an uplink part (UpPTS). The remaining subframes are either allocated to UL or DL transmission. An example UL and DL configuration is shown in Table 1 below. Also, an exemplary special subframe configuration is shown in Table 2 below.

TABLE 1

Exemplary UL and DL configuration in TDD.

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 2

Example configuration of special subframe.

| Special subframe configuration | Normal cyclic prefix in downlink | | | Extended cyclic prefix in downlink | | |
| --- | --- | --- | --- | --- | --- | --- |
| | DwPTS | UpPTS | | DwPTS | UpPTS | |
| | | Normal cyclic prefix in uplink | Extended cyclic prefix in uplink | | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

TDD allows for different asymmetries in terms of the amount of resources allocated for UL and DL transmission, respectively, by means of different DL/UL configurations. In LTE, there are seven different configurations, see FIG. 2. Generally speaking, to avoid significant interference between DL and UL transmissions between different radio cells, neighboring radio cells should have the same DL/UL configuration. Otherwise, UL transmission in one radio cell may interfere with DL transmission in the neighboring radio cell (and vice versa). As a result, the DL/UL asymmetry generally does not vary between radio cells. The DL/UL asymmetry configuration is signaled, i.e. communicated, as part of the system information and can remain fixed for a long time.

Consequently, the TDD networks generally use a fixed frame configuration where some subframes are UL and some are DL. This may prevent or at least limit the flexibility to adopt the UL and/or DL resource asymmetry to varying radio traffic situations. This may be particularly challenging in heterogeneous networks, e.g. a network comprising multiple pico cells and/or a mixture of multiple macro cells and/or pico cells. In order to provide a more flexible TDD configuration, so-called Dynamic TDD (also sometimes referred to as Flexible TDD) has therefore been introduced. Dynamic TDD provides the ability of a subframe to be configured as "flexible" subframe. As a result, some subframes can be configured dynamically as either for UL transmission or for DL transmission. The subframes can for example be configured as either for UL transmission or DL transmission depending on e.g. the radio traffic situation in a cell. Accordingly, Dynamic TDD can be expected to achieve promising performance improvement in TDD systems when there is a potential load imbalance between UL and DL. However, the benefits achieved by Dynamic TDD could potentially be counteracted or limited by inter-cell interference. Inter-cell interference may become a particular challenge when designing and/or deploying heterogeneous networks and has therefore been discussed in 3GPP. For example, Section 8 in the 3GPP Technical Report 3*GPP TR 36.828, "Evolved Universal Terrestrial Radio Access (E-UTRA); Further enhancements to LTE Time Division Duplex (TDD) for Downlink-Uplink (DL-UL) interference management and traffic adaption"*, v.11.0.0, identifies four different interference schemes that may cause additional complexity in radio communication networks using LTE TDD, e.g. in the eNBs or in the UEs or in both eNBs and UEs. Consequently, in heterogeneous networks it may become important to mitigate, alleviate or reduce the effects of interference.

SUMMARY

It is in view of the above considerations and others that the various embodiments of the present technology have been made.

It is a general object to provide for an improved resource allocation in a radio communication network. It would furthermore be desirable to provide for a means to mitigate, alleviate, or reduce inter-cell interference in a radio communication network using TDD, such as Dynamic TDD.

The technology as set forth in the appended independent claims addresses this general object. The appended dependent claims represent additional advantageous embodiments of the technology as disclosed herein.

According to an aspect, there is provided a method performed by a radio network node, such as an evolved NodeB (eNB). The method comprises determining a time division duplex (TDD) configuration. The TDD configuration comprises one or more subframes preconfigured as downlink subframes, one or more subframes preconfigured as uplink subframes, and one or more flexible subframes each preconfigured to be dynamically allocated either as an uplink subframe or as a downlink subframe. Optionally, the TDD configuration may also comprise special subframes. The method also comprises determining, for each flexible subframe, an allocation priority and/or allocation probability of using the flexible subframe as an uplink subframe or as a downlink subframe. In other words, the method comprises determining (for each flexible subframe) either of or both of an allocation priority and an allocation probability of using the flexible subframe as an uplink subframe or as a downlink subframe.

Accordingly, in some embodiments an allocation priority can be determined whereas in other embodiments an allocation probability can be determined. In yet other embodiments, both an allocation priority and an allocation probability can be determined.

Moreover, the method comprises allocating resources to at least one user equipment, UE, based on the determined allocation priority and/or allocation probability. In other words, in some embodiments, the method may comprise allocating resources to the at least one UE based on a determined allocation priority. In other embodiments, the method may comprise allocating resources to the at least one UE based on a determined allocation probability. In still further embodiments, the method may comprise allocating resources to the at least one UE based on a determined allocation priority as well as a determined allocation probability.

In some embodiments, allocating resources to the at least one UE may comprise: assigning resources to the at least one UE in the flexible subframe based on the determined allocation priority and/or allocation probability; and signaling to the at least one UE information about the assigned resources. In other embodiments, allocating resources to the at least one UE may comprise: assigning resources to the at least one UE in the flexible subframe based on the determined allocation priority and/or allocation probability; and signaling to the at least one UE the determined allocation priority and/or allocation probability. I still further embodiments, allocating resources to the at least one UE may comprise: assigning resources to the at least one UE in the flexible subframe based on the determined allocation priority and/or allocation probability; and signaling to the at least one UE information about the assigned resources as well as signaling to the at least one UE the determined allocation priority and/or allocation probability.

Determining the allocation priority may comprise determining the allocation priority of using each resource block in the flexible subframe for uplink or downlink transmission, and assigning the allocation priority for scheduling one or more resource blocks in each flexible subframe. Additionally, or alternatively, determining the allocation probability may comprise determining the allocation probability of using each resource block in the flexible subframe for uplink or downlink transmission, and assigning the allocation probability for scheduling one or more resource blocks in each flexible subframe.

The method may additionally comprise signaling, i.e. transmitting, to the at least one UE the determined allocation priority and/or allocation probability of using each resource block in the flexible subframe for uplink or downlink transmission. Additionally, or alternatively, the method may comprise signaling, i.e. transmitting, to the at least one UE the assigned allocation priority and/or allocation probability for scheduling the one or more resource blocks in each flexible subframe.

In some embodiments, determining the allocation priority is based on one or several of the following criteria: a determined traffic load, a determined signal quality, a determined traffic demand, a determined proportion of traffic direction, a determined service type, a determined earlier-assigned allocation priority and/or allocation probability, a determined allocation priority and/or allocation probability in one or more neighboring radio cells. In some embodiments, determining the allocation probability is based on one or several of the following criteria: a determined traffic load, a determined signal quality, a determined traffic demand, a determined proportion of traffic direction, a determined service type, a determined earlier-assigned allocation priority and/or allocation probability, a determined allocation priority and/or allocation probability in one or more neighboring radio cells.

Furthermore, the method may comprise assigning an allocation priority to the same flexible subframe in one or more neighboring cells. Additionally, or alternatively, the method may comprise assigning an allocation probability to the same flexible subframe in one or more neighboring cells.

In some embodiments, the method may comprise allocating the one or more flexible subframes which are assigned high allocation priority and/or allocation probability (i.e. an allocation priority and/or allocation probability above a pre-defined threshold) to at least one UE experiencing interference above a predefined interference threshold. In some embodiments, the method may comprise allocating the one or more flexible subframes which are assigned high allocation priority and/or allocation probability (i.e. an allocation priority and/or allocation probability above a pre-defined threshold) to at least one UE experiencing signal quality below a predefined signal quality threshold.

In other embodiments, the method may comprise allocating the one or more resource blocks in the flexible subframes which are assigned high allocation priority and/or allocation probability (i.e. an allocation priority and/or allocation probability above a pre-defined threshold) to at least one UE experiencing interference above a predefined interference threshold. In yet other embodiments, the method may comprise allocating the one or more resource blocks in the flexible subframes which are assigned high allocation priority and/or allocation probability (i.e. an allocation priority and/or allocation probability above a pre-defined threshold) to at least one UE experiencing signal quality below a predefined signal quality threshold The allocation priority in the same flexible subframe may advantageously be complementary in that a flexible subframe with higher allocation priority of downlink transmission has lower allocation priority of uplink transmission and vice versa. Additionally, or alternatively, the allocation probability in the same flexible subframe may be complementary in that a flexible subframe with higher allocation probability of downlink transmission has lower allocation probability of uplink transmission and vice versa.

Still further, the method may comprise exchanging, with one or several other radio network nodes, information about the determined allocation priority using the flexible subframe as an uplink subframe or as a downlink subframe. Additionally, or alternatively, the method may comprise exchanging, with one or several other radio network nodes, information about the determined allocation probability using the flexible subframe as an uplink subframe or as a downlink subframe.

In another aspect, there is provided a method performed by a user equipment (UE). The method comprises receiving, from a radio network node, information about information about a determined allocation priority and/or allocation probability of using a flexible subframe as an uplink subframe or as a downlink subframe. The method may additionally, or alternatively, comprise receiving, from a radio network node, information about assigned resources. The method may alternatively comprise receiving, from a radio network node, information about assigned resources information as well as a determined allocation priority and/or allocation probability of using a flexible subframe as an uplink subframe or as a downlink subframe.

The method may additionally comprise receiving, from the radio network node, a determined allocation priority of using each resource block in a flexible subframe for uplink or downlink transmission. Additionally, or alternatively, the method may comprise receiving, from the radio network node, a determined allocation probability of using each resource block in a flexible subframe for uplink or downlink transmission.

Additionally, or alternatively, the method may comprise receiving, from the radio network node, the assigned allocation priority for scheduling the one or more resource blocks in each flexible subframe. Additionally, or alternatively, the method may comprise receiving, from the radio network node, the assigned allocation probability for scheduling the one or more resource blocks in each flexible subframe.

In still another aspect, there is provided a radio network node. The radio network node may exemplified by an evolved NodeB (eNB). The radio network node may be configured to perform the method according to the above-mentioned first aspect.

In one non-limiting example implementation, the radio network node comprises a communication interface configured for wireless communication. This communication interface may comprise a transmitter, a receiver or both a transmitter and a receiver. Alternatively, the communication interface may comprise a transceiver. In this non-limiting example implementation, the radio network node also comprises a processor; and a memory storing computer program code which, when run in the processor causes the radio network node to: determine a time division duplex, TDD, configuration, wherein the TDD configuration comprises one or more subframes preconfigured as downlink subframes, one or more subframes preconfigured as uplink subframes, and one or more flexible subframes each preconfigured to be dynamically allocated either as an uplink subframe or as a downlink subframe; determine, for each flexible subframe, an allocation priority and/or allocation probability of using the flexible subframe as an uplink subframe or as a downlink subframe; and allocate resources to at least one user equipment, UE, based on the determined allocation priority and/or allocation probability.

In some embodiments, the memory and the computer program code may be configured to, with the processor, cause the radio network node to: assign resources to the at least one UE in the flexible subframe based on the determined allocation priority and/or allocation probability; and signal to the at least one UE information about the assigned resources. Additionally, or alternatively, the memory and the computer program code may be configured to, with the processor, cause the radio network node to: assign resources to the at least one UE in the flexible subframe based on the determined allocation priority and/or allocation probability; and signal to the at least one UE the determined allocation priority and/or allocation probability.

In some embodiments, the memory and the computer program code may be configured to, with the processor, cause the radio network node to: determine the allocation priority and/or allocation probability of using each resource block in the flexible subframe for uplink or downlink transmission, and assign the allocation priority and/or allocation probability for scheduling one or more resource blocks in each flexible subframe.

Optionally, the memory and the computer program code may also be configured to, with the processor, cause the radio network node to signal (using the communication interface) to the at least one UE the determined allocation priority and/or allocation probability of using each resource block in the flexible subframe for uplink or downlink transmission. Additionally, or alternatively, the memory and the computer program code may also be configured to, with the processor, cause the radio network node to signal (using the communication interface) to the at least one UE the assigned allocation priority and/or allocation probability for scheduling the one or more resource blocks in each flexible subframe.

Also, the memory and the computer program code may be configured to, with the processor, cause the radio network node to determine the allocation priority based on one or several of the following criteria: a determined traffic load, a determined signal quality, a determined traffic demand, a determined proportion of traffic direction, a determined service type, a determined earlier-assigned allocation priority and/or probability, a determined allocation priority and/or probability in one or more neighboring radio cells. Additionally, or alternatively, memory and the computer program code may be configured to, with the processor, cause the radio network node to determine the allocation probability based on one or several of the following criteria: a determined traffic load, a determined signal quality, a determined traffic demand, a determined proportion of traffic direction, a determined service type, a determined earlier-assigned allocation priority and/or probability, a determined allocation priority and/or probability in one or more neighboring radio cells.

Moreover, the memory and the computer program code may be configured to, with the processor, cause the radio network node to assign an allocation priority to the same flexible subframe in one or more neighboring cells. Additionally, or alternatively, the memory and the computer program code may be configured to, with the processor, cause the radio network node to assign an allocation probability to the same flexible subframe in one or more neighboring cells.

Still further, the memory and the computer program code may be configured to, with the processor, cause the radio network node to allocate the one or more flexible subframes (or, alternatively one or more resource blocks in the flexible subframes) which are assigned allocation priority and/or allocation probability above a pre-defined threshold, to at least one UE experiencing interference above a predefined interference threshold. Alternatively, the memory and the computer program code may be configured to, with the processor, cause the radio network node to allocate the one or more flexible subframes (or, alternatively, one or more resource blocks in the flexible subframes) which are assigned allocation priority and/or allocation probability above a pre-defined threshold, to at least one UE experiencing signal quality below a predefined signal quality threshold.

The allocation priority in the same flexible subframe may advantageously be complementary in that a flexible subframe with higher allocation priority of downlink transmission has lower allocation priority of uplink transmission and vice versa. Additionally, or alternatively, the allocation probability in the same flexible subframe may be complementary in that a flexible subframe with higher allocation probability of downlink transmission has lower allocation probability of uplink transmission and vice versa Furthermore, the memory and the computer program code may be configured to, with the processor, cause the radio network node to exchange (using the communication interface) with one or several other radio network nodes, information about the determined allocation priority and/or allocation probability using the flexible subframe as an uplink subframe or as a downlink subframe.

According to still another aspect, there is provided a user equipment (UE). The UE may be configured to perform the method according to the above-mentioned second aspect.

In one non-limiting example implementation, the UE comprises a communication interface. This communication interface may comprise a transmitter, a receiver or both a transmitter and a receiver. Alternatively, the communication interface may comprise a transceiver. In this non-limiting example implementation, the communication interface (e.g. a receiver or transceiver) is configured to receive, from a radio network node, information about information about a determined allocation priority and/or probability of using a flexible subframe as an uplink subframe or as a downlink subframe. In another non-limiting example implementation, the communication interface (e.g. a receiver or transceiver) is configured to receive, from a radio network node, information about assigned resources. In yet another non-limiting example implementation, the communication interface (e.g. a receiver or transceiver) is configured to receive, from a radio network node, information about assigned resources as well as information about a determined allocation priority and/or probability of using a flexible subframe as an uplink subframe or as a downlink subframe.

The communication interface (e.g. a receiver or a transceiver) may also be configured to receive, from the radio network node, a determined allocation priority and/or allocation probability of using each resource block in a flexible subframe for uplink or downlink transmission. Additionally, or alternatively, the communication interface may be configured to receive, from the radio network node, the assigned allocation priority and/or allocation probability for scheduling the one or more resource blocks in each flexible subframe.

Allocating resources to UE(s) based on a determined allocation priority and/or allocation probability may allow for an improved resource allocation in radio communication networks, such as those using TDD (e.g. Dynamic TDD). For example, allocating resources on the basis of a determined allocation priority and/or allocation probability according some of the embodiments disclosed herein may allow for mitigating, alleviating, or reducing inter-cell interference. Therefore, some embodiments disclosed herein can allow for an overall performance improvement of the radio communication network.

BRIEF DESCRIPTION OF THE DRAWINGS

These and other aspects, features and advantages of the technology will be apparent and elucidated from the following description of embodiments of the present technology, reference being made to the accompanying drawings, in which.

DETAILED DESCRIPTION

Figure 1:
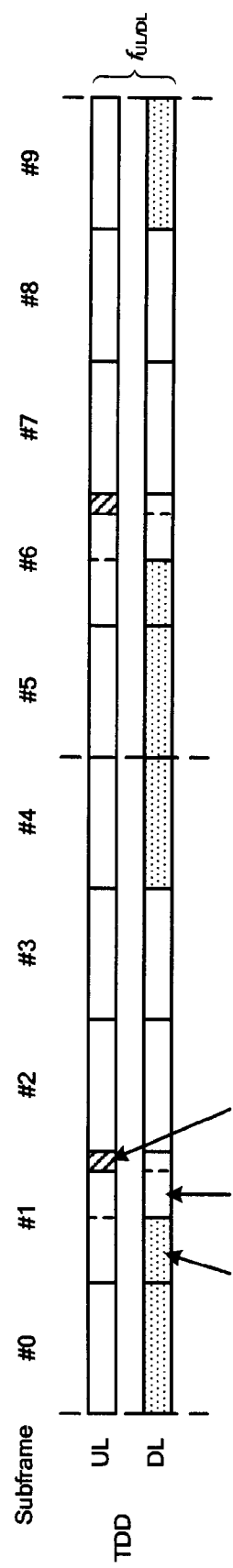
FIG. 1 illustrates uplink/downlink time/frequency structure for LTE TDD.
Figure 2:
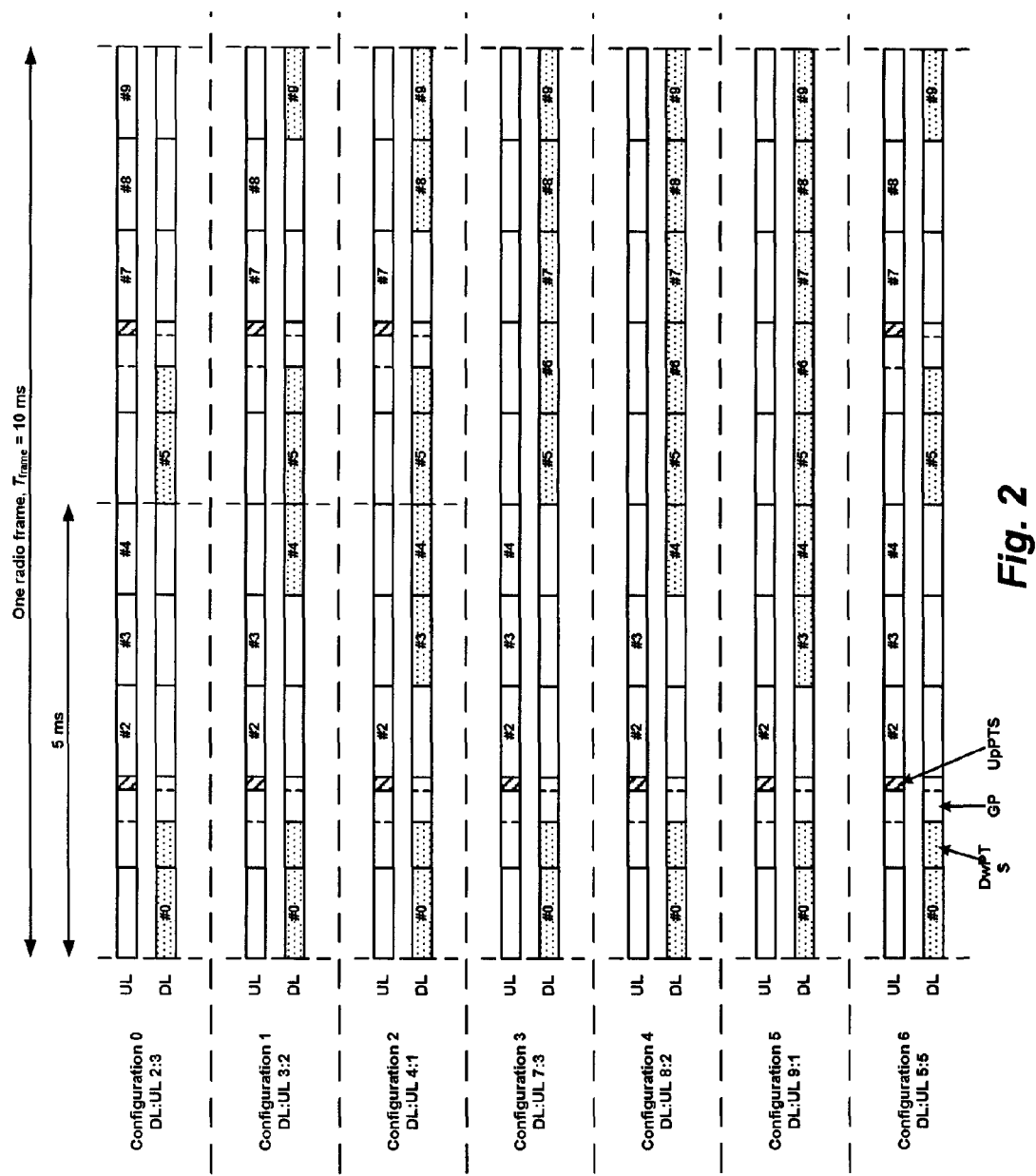
FIG. 2 is a diagram illustrating an example of seven different downlink/uplink configurations for LTE TDD.

In the following description, for purposes of explanation and not limitation, specific details are set forth such as particular architectures, interfaces, techniques, etc. However, it will be apparent to those skilled in the art that the technology described here may be practiced in other embodiments that depart from these specific details. That is, those skilled in the art will be able to devise various arrangements which, although not explicitly described or shown herein, embody the principles of the technology described and are included within its scope. In some instances, detailed descriptions of well-known devices, circuits, and methods are omitted so as not to obscure the description with unnecessary detail. All statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated by those skilled in the art that block diagrams herein can represent conceptual views of illustrative circuitry embodying the principles of the technology. Similarly, it will be appreciated that any flow charts and the like represent various processes which may be substantially represented in computer readable medium and so executed by a computer or processor, whether or not such computer or processor is explicitly shown. The functions of the various elements including functional blocks labeled or described as "processor" may be provided through the use of dedicated hardware as well as hardware capable of executing software in the form of coded instructions stored on computer readable medium. When provided by a processor, the functions may be provided by a single dedicated processor, by a single shared processor, or by a plurality of individual processors, some of which may be shared or distributed. Such functions are to be understood as being computer-implemented and thus machine-implemented. Moreover, use of the term "processor" or shall also be construed to refer to other hardware capable of performing such functions and/or executing software, and may include, without limitation, digital signal processor (DSP) hardware, reduced instruction set processor, hardware (e.g., digital or analog) circuitry, and (where appropriate) state machines capable of performing such functions.

As used hereinafter, it should be appreciated the term UE may be referred to as a mobile terminal, a terminal, a user terminal (UT), a wireless terminal, a wireless communication device, a wireless transmit/receive unit (WTRU), a mobile phone, a cell phone, etc. Yet further, the term UE includes MTC (Machine Type Communication) devices, which do not necessarily involve human interaction. Also, the term "radio network node" as used herein generally denotes a fixed point being capable of communicating with the UE. As such, it may be referred to as a base station, a radio base station, a NodeB or an evolved NodeB (eNB), access point, relay node, etcetera.

The technology in this disclosure introduces allocation of resources to one or more UEs based on a determined allocation priority and/or allocation probability. An allocation priority and/or allocation probability can be determined for (or, assigned to) each one of a plurality of flexible subframes. The allocation priority may indicate a priority, or prioritization, for allocating the flexible subframe as an uplink (UL) subframe or as a downlink (DL) subframe. Similarly, the allocation probability may indicate a probability, or likelihood, for allocating the flexible subframe as an uplink (UL) subframe or as a downlink (DL) subframe. Resources are allocated to one or more UEs on the basis of the allocation priority and/or allocation probability. This technology is advantageous for example in TDD based radio communication, but is not limited to TDD. In other words, flexible subframes can be used for UL or DL transmission as needed or desired, based on the determined allocation priority and/or allocation probability. This may also allow for mitigating, alleviating or reducing inter-cell interference. Hence, this may allow for performance improvements.

Figure 3A:
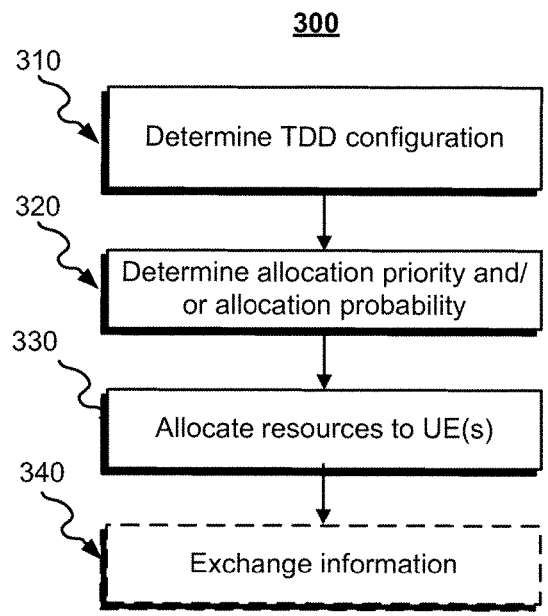
FIG. 3a-c are flowcharts of example methods for a radio network node.

FIG. 3 is a flowchart illustrating a non-limiting example procedure 300 for a radio network node (for example, an eNB) in a radio communication network employing flexible subframes. With reference to FIG. 3a, a TDD configuration is determined 310. The TDD configuration comprises one or more subframes preconfigured as DL subframes, one or more subframes preconfigured as UL subframes, and one or more flexible subframes each preconfigured to be dynamically allocated either as an UL subframe or as a DL subframe. The TDD configuration may also comprise special subframes. Furthermore, it is determined 320, for each flexible subframe, an allocation priority and/or allocation probability of using the flexible subframe as an UL subframe or as a DL subframe. In other words, the method comprises determining (for each flexible subframe) either of or both of an allocation priority and an allocation probability of using the flexible subframe as an UL subframe or as a DL subframe. Eventually, resources are allocated 330 to one or several UEs based on the determined allocation priority and/or allocation probability.

An allocation priority for each flexible subframe may advantageously be complementary in that a flexible subframe with a higher allocation priority of DL transmission has a lower allocation priority of UL transmission and vice versa. Additionally, or alternatively, the allocation probability for the flexible subframe may be complementary in that a flexible subframe with a higher allocation probability of DL transmission has a lower allocation probability of UL transmission and vice versa.

Figure 3B:
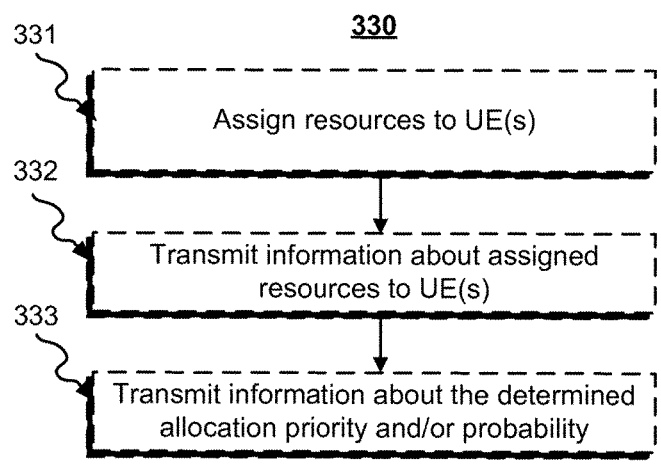

FIG. 3b is a flowchart illustrating a non-limiting example embodiment for allocating 330 resources to one or several UEs based on the determined allocation priority and/or allocation probability. Resources may be assigned 331 to one or several UEs in the flexible subframe based on the determined 320 allocation priority and/or allocation probability. Furthermore, information about the assigned resources may be signaled 332, i.e. transmitted, to the UE(s). In other words, the radio network node may be configured to transmit, i.e. send, a signal comprising an information element (or, a message) including the information about the assigned resources to the UE(s). Additionally, or alternatively, the determined allocation priority and/or allocation probability can be signaled 333, i.e. transmitted, to the UE(s). In other words, the radio network node may be configured to transmit, i.e. send, a signal comprising an information element (or, a message) including the information about the determined allocation priority and/or allocation probability to the UE(s).

Figure 3C:
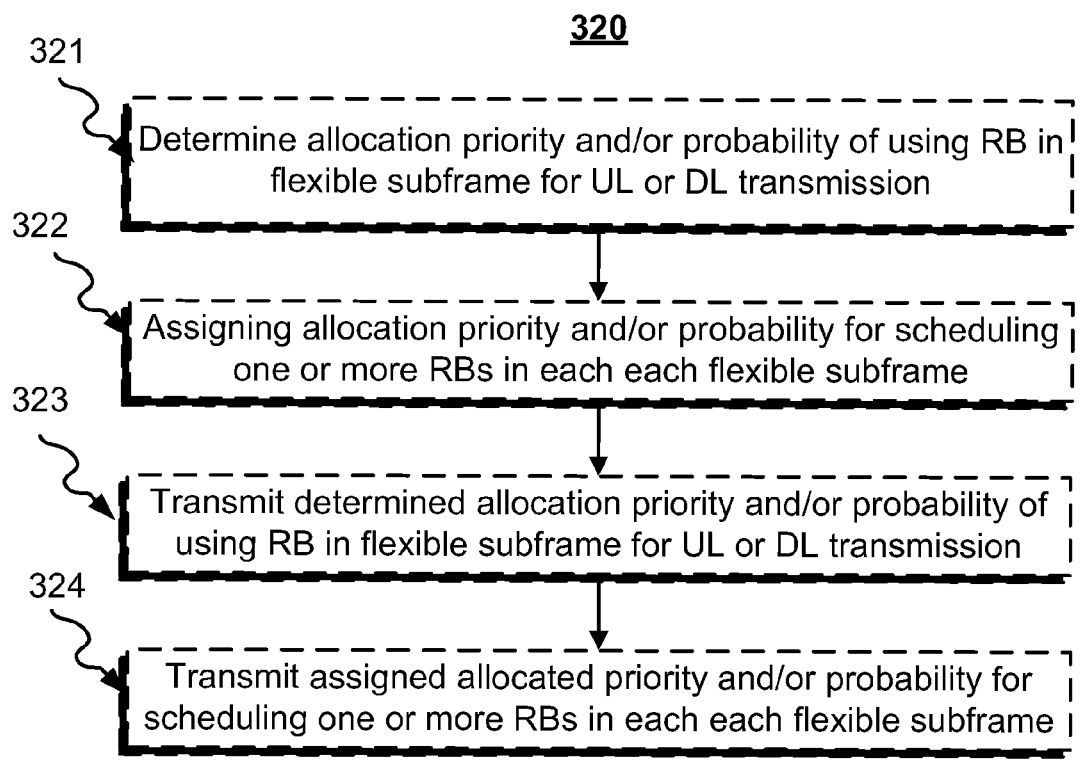

FIG. 3c is a flowchart illustrating a non-limiting example embodiment for determining 320 the allocation priority (and/or allocation probability). This procedure may comprise determining 321 the allocation priority (and/or allocation probability) of using each resource block in the flexible subframe for UL or DL transmission, and assigning 322 the allocation priority for scheduling one or more resource blocks in each flexible subframe. Additionally, or alternatively, the method may comprise signaling 323, i.e. transmitting, to the one or more UE(s) the determined allocation priority and/or allocation probability of using each resource block in the flexible subframe for UL or DL transmission. In other words, the radio network node may be configured to transmit, i.e. send, a signal comprising an information element (or, a message) including the information about determined allocation priority and/or allocation probability of using each resource block in the flexible subframe for UL or DL transmission. Additionally, or alternatively, the method may comprise signaling 324, i.e. transmitting, to the one or more UEs the assigned allocation priority and/or allocation probability for scheduling the one or more resource blocks in each flexible subframe. In other words, the radio network node may be configured to transmit, i.e. send, a signal comprising an information element (or, message) including the information about the assigned allocation priority and/or allocation probability for scheduling the one or more resource blocks in each flexible subframe.

It should be appreciated that assigning an allocation priority may comprise assigning the allocation priority to the same flexible subframe in one or more neighboring cells. Additionally, or alternatively, assigning an allocation probability may comprise assigning an allocation probability to the same flexible subframe in one or more neighboring cells.

Turning back to FIG. 3a, it should be appreciated that determining 320 the allocation priority can be based on one or several criteria. For example, the allocation priority can be based on a determined traffic load, a determined signal quality, a determined traffic demand, a determined proportion of traffic direction, a determined service type, a determined earlier-assigned allocation priority and/or allocation probability, a determined allocation priority and/or allocation probability in one or more neighboring radio cells. Similarly, it should be appreciated that determining the allocation probability can based on one or several of the following criteria: a determined traffic load, a determined signal quality, a determined traffic demand, a determined proportion of traffic direction, a determined service type, a determined earlier-assigned allocation priority and/or allocation probability, a determined allocation priority and/or allocation probability in one or more neighboring radio cells.

As will be further detailed hereinbelow, the procedure may comprise allocating 330 the one or more flexible subframes which are assigned high allocation priority and/or allocation probability (i.e. an allocation priority and/or allocation probability above a pre-defined threshold) to one or more UEs experiencing interference above a predefined interference threshold. In some example embodiments, the method may additionally, or alternatively, comprise allocating 330 the one or more flexible subframes which are assigned high allocation priority and/or allocation probability (i.e. an allocation priority and/or allocation probability above a pre-defined threshold) to at least one UE experiencing signal quality below a predefined signal quality threshold. Alternatively, the procedure may comprise allocating 330 the one or more resource blocks in the flexible subframes which are assigned high allocation priority and/or allocation probability (i.e. an allocation priority and/or allocation probability above a pre-defined threshold) to one or several UEs experiencing interference above a predefined interference threshold. In yet other example embodiments, the procedure may comprise allocating the one or more resource blocks in the flexible subframes which are assigned high allocation priority and/or allocation probability (i.e. an allocation priority and/or allocation probability above a pre-defined threshold) to one or more UEs experiencing signal quality below a predefined signal quality threshold.

Optionally, the radio network node may also exchange 340, i.e. communicate (e.g. transmit and/or receive), with one or several other radio network nodes (e.g. eNBs), information about the determined allocation priority and/or allocation probability using the flexible subframe as an UL subframe or as a DL subframe. In other words, the radio network node may be configured to transmit and/or receive signals comprising information elements (or, messages) including the information about the determined allocation priority and/or allocation probability using the flexible subframe as an UL subframe or as a DL subframe.

Figure 4:
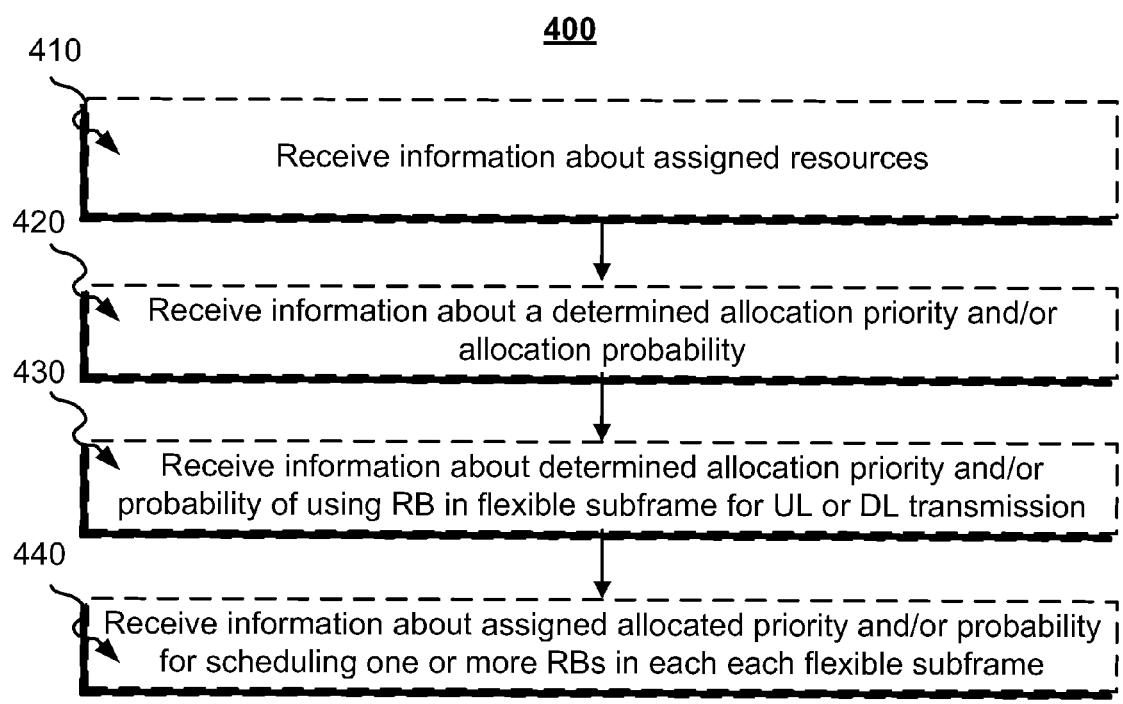
FIG. 4 is a flowchart of an example method for a user equipment.

FIG. 4 is a flowchart illustrating a non-limiting example procedure for a user equipment (UE) in a radio communication network employing flexible subframes. The procedure may comprise receiving 410, from a radio network node, information about assigned resources. In other words, the UE may be configured to receive a signal comprising an information element (or, a message) including the information about assigned resources. Additionally, or alternatively, the procedure may comprise receiving 420, from a radio network node (e.g. eNB), information about a determined allocation priority and/or allocation probability of using a flexible subframe as either a UL subframe or a DL subframe. In other words, the UE may be configured to receive a signal comprising an information element (or, a message) including the information about the determined allocation priority and/or allocation probability of using a flexible subframe as either a UL subframe or a DL subframe.

The procedure may additionally comprise receiving 430, from the radio network node, a determined allocation priority and/or probability of using each resource block in a flexible subframe for uplink or downlink transmission. Additionally, or alternatively, the procedure may comprise receiving 440, from the radio network node, the assigned allocation priority and/or probability for scheduling the one or more resource blocks in each flexible subframe.

Various non-limiting example embodiments of the technology will now be further detailed as non-limiting examples of the technology:

1.1. Time-Domain Resource Allocation (a.k.a. Time-Domain Interference Mitigation Scheme)

Examples of time domain resources include, e.g.: subframe, time slot, time period, OFDMA symbol, SC-FDMA symbol etc. This embodiment is described with an example using subframe as the time domain resource. However the embodiment is applicable to any type of time domain resource. According to this embodiment, each flexible subframe can be assigned with a different DL and/or UL allocation priority and/or probability for scheduling the UE in a particular transmission. The UL and/or DL allocation priority and/or probability in the same flexible subframe may be complementary. That is, a subframe with higher probability of DL transmission has a lower probability of UL transmission and vice versa. The method is implemented in a radio network node (e.g. a eNB) serving a UE or any network node that can communicate with the radio network node. By scheduling, or allocating, the subframes in a predetermined order based on allocation priority and/or probability, the probability that the same subframe is scheduled for transmission in different directions in neighboring cells can be considerably reduced. The determination of allocation priority and/or probability with which a transmission should take place in a flexible subframe can be done based on one or more criteria. The network nodes may also exchange their own allocation priority and/or probability for the flexible subframes. These aspects of this embodiment are elaborated below:

1.1.1 Determining Allocation Priority

The radio network node (for example (though not necessarily) a scheduler or a scheduling function thereof) may allocate the flexible subframes for DL transmission according to the assigned downlink allocation priority in descending order. Similarly, each flexible subframe can be assigned with a different UL allocation priority to be scheduled for UL transmission. Similarly radio network node may allocate the flexible subframes for UL transmission according to the assigned uplink allocation priority in descending order, i.e., schedule first with highest priority, and so forth. The radio network node may also take into account the radio condition based on UL and/or DL radio measurements in that subframe in order to allocate resources for scheduling.

According to one aspect of this embodiment a flexible subframe (e.g. subframe #3, see table 1) with higher allocation priority to be scheduled for DL transmission in a cell can be assigned with a lower allocation priority to be scheduled for UL transmission in another cell. According to the assigned allocation priority, the order of scheduling the flexible subframes for UL transmission in a cell is reversed with respect to the order of scheduling the flexible subframes for downlink transmission in another cell.

According to another aspect of this embodiment a flexible subframe with higher allocation priority to be scheduled for DL transmission in a cell can be assigned with a lower allocation priority to be scheduled for UL transmission in the same cell. Similarly in the same cell, the order of scheduling the flexible subframes for UL transmission in a cell is reversed with respect to the order of scheduling the same flexible subframes for DL transmission.

The subframe allocation priority can, for example, be expressed in terms of numerical values for each direction (i.e. UL or DL). For example flexible subframes #2, 4 and 8 in a cell can be assigned a priority of 0, 1 and 2 respectively for UL transmission and the same flexible subframes (i.e. #2, 4 and 8) in the same cell can be assigned priority of 2, 1 and 0 respectively for DL transmission. The subframe allocation priority can also be expressed in terms of distinct levels, such as "low", "medium", "high".

1.1.2 Determining Allocation Probability

According to another aspect of this embodiment the resources for UL or DL transmission in each flexible subframe can be assigned with certain probability by the radio network node. This may called subframe allocation/assignment probability. The allocation probability to a flexible subframe can be assigned in a distributed manner based on one or more criteria i.e. without considering the allocation probability. On the other hand the allocation probability to a flexible subframe can be assigned by considering the corresponding allocation probability to the same subframe in one or more neighboring cells i.e. by considering the allocation probability. In the latter case the same flexible subframe (e.g. subframe #3) used for transmission in opposite directions in different cells can be assigned with complementary probabilities. For example in cell 1, a flexible subframe #3 is used for DL transmission with a probability of 0.6 and UL transmission with 0.4. In another cell 2 (e.g. a cell, which is neighbor to cell 1) the same flexible subframe #3 is used for UL transmission with a probability of 0.4 whereas for DL transmission with a probability of 0.6. In order to take into account allocation probabilities used in more than one neighboring cells for the same flexible subframe, the network node may be capable of using a suitable function when determining the allocation probability for the same flexible subframe in a particular cell.

Examples of such functions could include: average, x-th percentage, median, maximum, minimum etc.

1.1.3 Criteria of Determining Subframe Allocation Priority and/or Probability to Flexible Subframe The subframe allocation priority and/or subframe allocation probability to one or more subframes in a cell can be determined, or assigned, by the network node based on one or several criteria. For example any one or combination of the following criteria is conceivable:

- Traffic requirements or traffic load in a cell. The traffic requirements or the traffic load can, in turn, be determined based on, e.g.: the number of active users, traffic need for users, buffer size (e.g. amount of traffic in the buffer in a cell and/or in user's buffer) etc. For example higher allocation priority or probability can be assigned to a flexible subframe in a cell if the traffic load is high i.e. above a certain pre-defined threshold.
- UL and/or DL received signal quality. The DL quality can be determined by the network node from the UE radio measurements (e.g. RSRP (Received Reference Signal Received Power), RSRQ (Reference Signal Received Quality), channel state information (CSI) reports, etc) performed on DL signals transmitted by the network. The UL quality can be determined by the network node from the radio measurements performed by the radio network node (e.g. SNR (Signal to Noise), SINR (Signal to Interference plus Noise Ratio), received interference power (RIP), etcetera) on signals transmitted by the UE. For example, if signal quality is below a threshold (e.g. RSRQ<−14 dB) then lower allocation priority or probability (e.g. 0.2) can be assigned to a flexible subframe in a cell. This could avoid further degradation of signal quality (since frequent use of flexible subframe statistically would cause more interference).
- Proportion of the direction of traffic in a cell. For example in a cell where there is generally more demand for UL traffic compared to the DL traffic, the UL subframe allocation probability can be set to a higher value and vice versa, e.g. more than 0.5 for UL.
- Type of services. Certain service requires more traffic in one direction. Therefore the characteristic of the service can also be used for determining the probability with which a certain flexible subframe can be used in a particular direction. For example in a cell if there is higher traffic of best effort services or video streaming that require more traffic in the DL then a flexible subframe could be assigned with higher allocation probability for transmission in the DL.
- Allocation Priority and/or probability assigned in a neighboring cell. when determining, or assigning, the allocation priority and/or allocation probability to a flexible subframes for UL and/or for DL it is conceivable to take into account the allocation priority and/or allocation probability for UL and/or DL used for the same flexible subframe in one or more neighboring cells.

1.1.4 Exchanging Allocation Priority and/or Allocation Probability Between Nodes Each network node may signal, i.e. communicate, the allocation priority and/or allocation probability for transmission in the UL and/or DL for one or more flexible subframe to one or more neighboring network nodes. For example each eNB may signal this information to other eNBs over the X2 interface. Thus, this may be carried out according to signaling procedures and messages as further detailed in the X2 Application Protocol, X2AP, see 3GPP TS 36.423 V.11.3.0.

Each network node may use the received information related to the allocation priorities and/or allocation probabilities in neighboring nodes for one or more purposes as explained in sections 1.1.1-1.1.2, e.g.

- For determining, or assigning, the allocation priorities and/or allocation probabilities to its own flexible subframes.
- For determining whether to use a particular subframe as a flexible subframe or not.
- For determining whether to use additional criteria (e.g. described in section 1.1.3) for allocation priorities and/or allocation probabilities for one or more flexible subframes.
- For mitigating, or reducing, interference for one or more UEs in a cell by performing cell change to another carrier or Radio Access Technology (RAT). Examples of cell change are handover, primary carrier change in multi-carrier operation, PCell change in multi-carrier operation, RRC re-establishment, RRC connection release with redirection, etcetera.

The radio network node may, for example, send the above information to another radio network node in any of the following manner:

- Proactively sending to another node without receiving any explicit request from another network node (e.g. neighboring or any target network node)
  Proactive reporting can be done when a certain condition is met, criterion is fulfilled or event occurs etc. For example when allocation priority and/or probability is changed for a flexible subframe.
- Sending it upon receiving any explicit request from another network node (e.g. neighboring or any target network node).
  The explicit request can be sent to the radio network node by another network node anytime or at any specific occasion. For example the request for sending the allocation priority and/or probability can be sent to the radio network node in response to change in load in the cell (e.g. increase in number of active users etc), change in radio condition (e.g. increase in interference in UL in certain subframes or in flexible subframes etc).

1.1.5 Signaling Information about Allocation Priority and/or Allocation Probability to UE A radio network node may signal, i.e. transmit, the allocation priority and/or allocation probability for transmission in the UL and/or DL for one or more flexible subframes to the UEs connected to a cell served by the said serving network node. The radio network node may also signal allocation priorities and/or allocation probabilities assigned to flexible subframes in one or more neighboring cells to the UEs in that cell.

The UE may use the received information related to the allocation priorities and/or allocation probabilities for operational tasks. Examples of such tasks may for instance include:

- The UE does not use a flexible subframe which has a lower probability of allocation in the DL (e.g. 0.2 or less) for performing DL radio measurement (e.g. RSRP, RSRQ etc) in that cell (e.g. serving or neighboring cell). Instead the UE may use other non-flexible subframes for performing such DL radio measurements.
- The UE uses a flexible subframe with very high probability of allocation in the DL (e.g. 0.7 or above) for performing DL radio measurement.
- The UE uses a more robust receiver for receiving a flexible subframe when used in DL, if the DL allocation priority and/or probability is low. This is because in this case the reception in the DL subframe may suffer from higher interference caused by the UL transmission in one or more neighboring cells.

A device-to-device (D2D) capable UE may not use a flexible subframe which has lower allocation priority and/or lower allocation probability for D2D communication. This may be to avoid interference on such resources. Alternatively the D2D capable UE may only occasionally use (e.g. once every 100 ms) such a flexible subframe which has a relatively lower allocation priority and/or lower allocation probability.

The radio network node may signal, i.e. transmit, the above information to the UE in a broadcast message to all UEs, in a multi-cast message to a group of UEs or to specific UE in a dedicated message.

2.1 Frequency-Domain Resource Allocation (a.k.a. Frequency-Domain Interference Mitigation Scheme)

Examples of frequency domain resources include resource blocks (also known as physical resource block (PRB), subband (e.g. group of PRBs), subcarrier, carrier frequency, frequency channel, etcetera. This example embodiment is described with an example using sub-band or PRB as the frequency domain resource. However the embodiment is applicable to any type of frequency domain resource.

According to this aspect of the technology, each frequency resource (e.g. sub-band, PRB etc) in a flexible time domain resource (e.g. subframe) can be assigned with a DL downlink allocation priority and/or probability to be scheduled for downlink transmission. The radio network node (e.g. a scheduler thereof) may allocate the PRBs in one flexible subframe for DL transmission according to the assigned, or determined, DL allocation priority in descending order. Similarly, each PRB in a flexible subframe is assigned with a different UL allocation priority and/or probability to be scheduled for UL transmission. The radio network node (e.g. a scheduler thereof) may allocate the PRBs in one flexible subframe for UL transmission according to the assigned UL allocation priority descending order. In one flexible subframe, a sub-band (or PRBs) assigned with higher allocation priority to be scheduled for DL transmission is assigned with a lower allocation priority to be scheduled for UL transmission. Also, a sub-band (or PRBs) assigned with higher allocation probability should be allocated with lower allocation probability in a neighboring cells. According to the assigned allocation priority and/or probability, the order of scheduling the sub-bands (or PRBs) in one flexible subframe for UL transmission can be reversed with respect to the order of scheduling the sub-bands in one flexible subframe for DL transmission. There are different ways to assign, or determine, the allocation priority and/or probability of the sub-bands (or PRBs). The indexes of the neighboring PRBs in scheduling priority can be either localized for simplicity or distributed to improve frequency diversity. By allocating the PRBs in a flexible subframe in predetermined allocation priority and/or probability, the probability of one sub-band scheduled for transmission in different directions between neighboring cells may be considerably reduced.

The method may be implemented in a radio network node serving a UE or any network node that can communicate with the serving radio network node. The serving radio network node schedules frequency domain resources to the UE for UL and/or DL transmissions.

The radio network nodes may also exchange their own allocation priority and/or probability for the sub-bands/ PRBs in flexible subframes. These aspects of this embodiment are elaborated in the following sections:

2.1.1 Determining Allocation Priority

Similar to the time-domain allocation priority assignment described in section 1.1.1, the radio network node (e.g. a scheduler or a scheduling function thereof) may allocate the frequency resource (e.g. PRBs) for DL transmission according to the assigned DL allocation priority in descending order in a flexible subframe. Similarly, each PRB is assigned with a different UL allocation priority to be scheduled for UL transmission in a flexible subframe. Similarly the radio network node (e.g. the scheduler) may allocate the PRBs for UL transmission according to the assigned UL allocation priority in descending order i.e. schedule first with highest priority. The scheduler also takes into account the radio condition based on UL and/or DL radio measurements in that subframe in order to allocate resources for scheduling. This may be referred to as frequency domain resource allocation or assignment priority.

According to one aspect of this embodiment, a PRB (or sub-band) assigned with higher allocation priority to be scheduled for DL transmission in a cell is assigned with a lower allocation priority to be scheduled for UL transmission in another cell. According to the assigned allocation priority, the order of scheduling the sub-bands in the flexible subframes for UL transmission in a cell may be reversed with respect to the order of scheduling the sub-bands in the flexible subframes for downlink transmission in another cell.

According to another aspect of this embodiment, a PRB (or sub-band) assigned with higher allocation priority to be scheduled for downlink transmission in a flexible subframe in a cell can be assigned with a lower allocation priority to be scheduled for UL transmission in the same cell. Similarly in the same cell, the order of scheduling the sub-bands for UL transmission in a cell may be reversed with respect to the order of scheduling the same sub-bands for downlink transmission.

The PRB (or sub-band) allocation priority can be expressed in terms of numerical values for each direction. For example flexible sub-band #0, 1 and 2 in a flexible subframe in a cell can be assigned priority of 0, 1 and 2 respectively for UL transmission and the same sub-bands (i.e. #0, 1 and 2) in the same cell can be assigned priority of 2, 1 and 0 respectively for DL transmission. The sub-band allocation priority can also be expressed in terms of distinct levels e.g. low, medium, high.

2.1.2 Determining Allocation Probability

According to another aspect of this embodiment, the frequency resources for UL or DL transmission in each flexible subframe can be assigned with a certain probability by the network node. This may be called as subband (or, PRB) allocation/assignment probability. Alternatively, it may be referred to as frequency domain resource allocation/ assignment probability. The allocation probability to the sub-bands (or PRBs) in a flexible subframe can be assigned in a distributed manner based on one or more criteria. As one instance, the assignment does not consider the allocation probability in the neighboring cells. On the other hand the allocation probability to the sub-bands (or PRBs) in a flexible subframe can be assigned by considering the corresponding allocation probability to the sub-bands (or PRBs) in the same subframe in one or more neighboring cells. In the latter case the sub-bands (or PRBs) in the same flexible subframe (e.g. subframe #3) used for transmission in opposite directions in different cells may be assigned with complementary probabilities. For example, in a first cell sub-band n (or PRB n) in a flexible subframe can be used for DL transmission with a probability of 0.6 and UL transmission with 0.4. In another cell (e.g. which is a neighboring cell to the first cell) sub-band n (or PRB n) in the same flexible subframe can be used for UL transmission with a probability of 0.4 whereas for DL transmission with a probability of 0.6. In order to take into account allocation probabilities used in more than one neighboring cells for the same flexible subframe, the network node may use a suitable function when determining the allocation probability for the PRBs in the same flexible subframe in a particular cell. Examples of such function include: average, x-th percentage, median, maximum, minimum etc.

2.1.3 Criteria of Assigning Subframe Allocation Priority and/or Probability to Frequency Resources The sub-band (or PRB) allocation priority and/or probability in one or more subframes in a cell can be determined or assigned by the radio network node based on one or more criteria. For example any one of or a combination of the following criteria can be used:

- Traffic requirements or load in a cell. This can, for example, be determined based on the number of active users, traffic need for users, buffer size (e.g. amount of traffic in the buffer in a cell and/or in user's buffer), etc. For example, higher allocation priority and/or probability can be assigned to some sub-bands in one or more flexible subframes in a cell if the traffic load is higher i.e. above a certain threshold.
- UL and/or DL received sub-band signal quality. The DL sub-band quality can be determined by the network node from the UE radio measurements (e.g. sub-band CQI (channel quality indicator), sub-band CSI (channel state information), etc) performed on DL signals transmitted by the network (e.g. eNB) or the uplink channel sounding when channel reciprocity is available (e.g., in a TDD system). The UL sub-band quality can be determined by the radio network node from the sub-band radio measurements performed by the radio network node (e.g. SNR, SINR, received interference power (RIP), etc) on signals transmitted by the UE. If sub-band signal quality is below a threshold (e.g. sub-band CQI<3 dB) then lower allocation priority or probability (e.g. 0.2) can be assigned to the sub-band in a flexible subframe in a cell. This may allow for avoiding a further degradation of signal quality of the weak sub-band due to UL-to-DL or DL-to-UL interference.
- Allocation Priority and/or allocation probability assigned in a neighboring cell. Each radio network node when assigning the allocation priority and/or allocation probability to the sub-bands in a flexible subframe for UL and/or for DL may take into account the allocation priority and/or allocation probability for UL and/or DL used for the same sub-bands in the same flexible subframe in one or more neighbor cells.

2.1.4 Exchanging Allocation Priority and/or Allocation Probability Between Radio Network Nodes Similar to signaling exchange defined in Section 1.1.4 for time domain resources, each radio network node may signal, i.e. transmit, the allocation priority and/or allocation probability for transmission in the UL and/or DL for the sub-bands (or PRBs) in one or more flexible subframes to one or more neighboring network nodes. For example each eNB may signal this information to other eNBs over X2 interface.

Each radio network node may use the received information related to the sub-band (or PRB) allocation priorities and/or allocation probabilities in neighboring nodes for one or more purposes as explained in sections 2.1.1-2.1.2 e.g.:

- For determining, or assigning, the allocation priorities and/or allocation probabilities to the sub-bands (or PRBs) in its own flexible subframes.
- For determining whether to use a particular subframe as a flexible subframe or not.
- For determining whether to use additional criteria (e.g. described in section 2.1.3) for allocation priorities and/or allocation probabilities for the sub-band (or PRBs) in one or more flexible subframes.
- For mitigating interference for one or more users in a cell by performing cell change to another carrier or RAT. Examples of cell change are handover, primary carrier change in multi-carrier operation, PCell change in multi-carrier operation, RRC re-establishment, RRC connection release with redirection etc.

The network node may, for example, send the above information to another network node in any of the following manners:

- Proactively sending to another radio network node without receiving any explicit request from another network node (e.g. neighboring or any target network node)
  Proactive reporting can be done when a certain condition is met, criterion is fulfilled or event occurs etc. For example when allocation priority and/or probability is changed for a flexible subframe.
- Sending it upon receiving any explicit request from another radio network node (e.g. neighboring or any target network node)
  The explicit request can be sent to the radio network node by another radio network node anytime or at any specific occasion. For example the request for sending the allocation priority and/or probability can be sent to the radio network node in response to change in load in the cell (e.g. increase in number of active users etc), change in radio condition (e.g. increase in interference in UL in certain subframes or in flexible subframes etc).

2.1.5 Signaling Allocation Priority and/or Probability to UE

According to this embodiment a radio network node may signal the allocation priority and/or allocation probability for transmission in the UL and/or DL for one or more frequency resources (e.g. PRBs) assigned to the UEs in a flexible subframe in a cell served by the said serving network node. The radio network node may also signal allocation priorities and/or allocation probabilities assigned to PRBs in flexible subframes in one or more neighboring cells to the UEs in that cell.

The UE may use the received information related to the allocation priorities and/or allocation probabilities for operational tasks. Examples of such tasks include, e.g.:

- The UE does not use a flexible subframe which has a lower probability of allocation in the DL (e.g. 0.2 or less) for performing DL radio measurement (e.g. RSRP, RSRQ etc) in that cell (e.g. serving or neighboring cell). Instead the UE uses other non-flexible subframes for performing such DL radio measurements.
- The UE uses a flexible subframe with very high probability of allocation in the DL (e.g. 0.7 or above) for performing DL radio measurement.
- The UE uses more robust receiver for receiving a flexible subframe when used in DL if DL allocation priority and/or probability is low. This is because in this case the reception in the DL subframe may suffer from higher interference caused by the UL transmission in neighboring cells.

A D2D capable UE may not use those PRBs which has lower allocation priority and/or lower allocation probability for D2D communication. This may be to avoid interference on such frequency resources and to prevent the degradation of signal quality. Alternatively the PRBs with lower allocation priority and/or lower allocation probability the D2D are used by the UE only occasionally (e.g. once every 100 ms) or selectively (e.g. 1 such PRB out of 20 PRBs).

The radio network node may signal the above information to the UE in a broadcast message to all UEs, in a multi-cast message to a group of UEs or to specific UE in a dedicated message.

3.1. Complimentary Resource Allocation (User Domain)

In the previous aspects of the technology described hereinabove with respect to sections 1.1 and 2.1, interference mitigation, or reduction, can be achieved by allocating resources in flexible subframes with different allocation priority and/or probability.

According to this embodiment, a UE which is in a poor radio condition (i.e., the most interference-vulnerable UEs) can be scheduled with a higher relative priority by a cell in the allocated sub-bands (or PRBs) belonging to flexible subframes which have higher allocation priority and/or probability in order to ensure the predetermined or minimum acceptable user experience for the users operating those UEs. Similarly, UEs which are in good radio conditions (i.e. less affected by or less vulnerable to interference) may be primarily assigned resources or scheduled in those flexible subframes, which have lower allocation priority and/or probability.

In one of its aspects, the interference-vulnerable UEs are scheduled with higher priority for uplink and/or downlink transmissions in the flexible sub-frames with higher allocation priority and/or probability in the serving cell (i.e., lower allocation priority in the neighboring cells). On the other hand, UEs which are not vulnerable to interference or less vulnerable to interference (i.e. in good radio conditions) are scheduled with lower priority in flexible subframes. Their allocation priority and/or probability for UL and/DL transmissions can be made complementary to that of the interference-vulnerable UEs for scheduling in flexible sub-frames. For example, if the scheduling priority varies between 0 to 4, then an interference-vulnerable UE and a UE without interference-vulnerability will be scheduled with priority levels 4 and 0 respectively in the same flexible subframe.

In another aspect of this embodiment, the interference-vulnerable users are scheduled with high priority for UL and/or DL transmissions on frequency resources (e.g. PRBs or sub-bands) with higher allocation priority and/or probability in the flexible sub-frames in the serving cell (i.e., lower allocation priority in the neighboring cells). On the other hand, UEs which are not vulnerable to interference or less vulnerable to interference (i.e. in good radio conditions) are scheduled on frequency resources (e.g. PRBs or sub-bands) with lower priority in flexible subframes. Their allocation priority and/or probability for UL/DL transmissions can be made complementary to that of the interference-vulnerable users for scheduling in flexible sub-frames. For example if the scheduling priority varies between 0 to 4, then an interference-vulnerable user and a user without interference-vulnerability will be scheduled with priority levels 4 and 0 respectively in the same set of sub-bands in the same flexible subframe.

3.1.1 Criteria for Determining UE Interference Vulnerability Level

The interference vulnerability level of the UE in UL and/or in DL could, for example, be determined by one or more radio measurements performed by the UE and/or a serving radio network node. Examples of such UE measurements include: path loss, UL power headroom, RSRP or RSRQ performed by the UE, BLER (block error rate), other measurements like CSI reports (e.g. CQI, PMI (precoding matrix indicator), RI (rank indicator), etcetera). Examples of radio network node measurements include: SNR, BLER, SINR, RIP, etcetera. Larger path loss or lower UL power headroom, lower RSRP/RSRQ values indicate: poor radio conditions, lower signal quality in other words depicts a higher vulnerability of the UE. Thus, the UE may be more vulnerable to in resist or handle or mitigate the inter-cell interference.

The UE interference vulnerability level can be expressed in terms of signal quality e.g. expected achievable SINR. It can also be expressed in terms of discrete levels e.g. 0, 1, 2, 3 and 4 where 0 means a UE is least vulnerable and 4 means most vulnerable to interference, respectively. In another example, the UE interference vulnerability level can be expressed in terms of qualitative scales e.g. "No", "Low", "Medium" and "High" interference vulnerability levels.

3.1.2. Exchanging Information with Respect to Complimentary Allocation

According to this embodiment, a serving radio network node of the UEs may also signal to other radio nodes (e.g., neighboring eNBs) the information related to prioritized assignment of resources with higher allocation priority and/or probability for UL and/or DL transmissions to its UEs which are in poor radio conditions (i.e. vulnerable UEs).

The serving node may also signal either an indication whether such prioritization should be used or not. Additionally, or alternatively, the radio network node may also signal to other radio network nodes the statistics (e.g. historical data) of prioritized assignment of resources to such UEs.

The serving network node may also signal, to other radio network nodes, interference vulnerability levels (e.g. low, medium etc) experienced in the cell by the UEs. The information may be signaled for selected UEs, for all UEs or in dependence of the earlier-mentioned statistics for a group of UEs.

A radio network node that receives such information may take into account (i.e. process and interpret) this information when transmitting signals in the entire flexible subframes and/or in specific frequency domain resources (e.g. certain sub-bands, PRBs etc). For example, the neighboring network node (e.g. serving second cell) may assign a relatively more robust transport format (e.g. modulation and coding scheme) and/or lower power for UL transmission in a certain flexible subframe if there exist at least a certain number of interference vulnerable UEs scheduled with higher priority in the same flexible subframe in at least one neighboring cell (e.g. first cell). In this way the inter-cell interference can be reduced towards the vulnerable UEs operating in the first cell in the flexible subframe.

4.1. Selection of Resource Allocation

In one of its aspects of technology, when a flexible subframe is used in the radio communication network, the radio network nodes may use the most suitable interference mitigation scheme among any of the schemes disclosed in this disclosure (e.g. the schemes disclosed in sections 1.1-3.1). In other words a scheme currently used by a radio network node (e.g. a eNB) can be conditionally enabled or disabled depending on one or more criteria.

The selection of scheme can be performed independently by each radio network node (e.g. eNB, RBS, relay node, etc). The selection can also be done or recommended by another radio network node (e.g. O&M, SON, OSS, neighboring radio node, MME, S-GW, etc) controlling or communicating with the radio network nodes. The information about selected scheme can also be exchanged between radio network nodes and signaled to the UE as described below:

4.1.1. Criteria for Selecting Resource Allocation

In general, a criterion for selecting the most suitable resource allocation can be radio characteristics of signals received by a UE and/or by a radio network node in a cell where at least one flexible subframe is used. Yet another criterion for selecting the most suitable resource allocation can be related to traffic characteristics e.g. cell load, throughput, buffer size of users, etc.

Examples of a criterion based on radio characteristics are the interference situation, radio environment and deployment scenario in a cell experienced by the UE and/or by the radio network node operating the cell and serving the UE. The interference situation can be determined from the UE and/or radio network node radio measurements. The radio environment can be characterized by radio channel profile and/or user speed and/or fading rate. The radio channel profile can be obtained by measuring channel delay spread, multipath spread in time, relative signal strengths of paths, frequency selectivity level etc. A radio channel is highly frequency selective if the radio channel characteristics changes over a large range of frequencies e.g. over 1-2 MHz. The user speed can be obtained by measuring Doppler speed of the UE. The can be based on radio measurements performed by one or plurality of the UEs and/or by the serving radio network node of the UEs. Examples of deployment scenario are cell size or dimension, power class of a radio node (e.g. macro BS, pico BS, home BS etc), indoor cells etc. The cell size can be expressed in terms of cell radius, inter-site distance i.e. distance between radio nodes etc. The radio characteristics such as interference situation in the neighboring cells can be determined based on information (e.g. radio measurements) obtained from the said neighboring cells e.g. via X2 interface using inter-cell/inter-node communication/signaling. The aspects described in sections 1.1 and 2.1 may put some constraints on the scheduling. For example, if the frequency diversity is limited, a UE may not be allocated with the best PRB or TTIs (Transmission Time Interval) according to the predetermined subframe and/or PRB allocated priorities.

Two examples of selecting a suitable based on one or more criteria indicated above are described in the following sections:

Example 1: Selection Based on Load in the Radio Cell

In this example, whether or not to use to use a certain resource allocation scheme (e.g. as disclosed in sections 1.1-3.1) is determined based on the cell load e.g. number of users for scheduling, resource usage such as PRB's allocation, transmission power level in UL and/or in DL etc.

In a low load situation (e.g. 10-20% radio resource usage in a cell, low transmit power etc), the UE-to-UE and eNB-to-eNB interference is generally low. In such low load scenario, it is less critical to mitigate the UE-to-UE and eNB-to-eNB interference. Therefore in this scenario more significant performance gain can be achieved by utilizing time and/or frequency domain diversity than by applying the time and/or frequency domain schemes disclosed in sections 1.1. and 2.1, respectively. In such case, the time and or frequency domain interference mitigation according to these sections can be disabled to allow the radio network node (e.g. the scheduler thereof) to have higher flexibility to utilize the time and/or -frequency channel variation in UE selection, resource allocation and MCS (modulation and coding scheme) selection so that the time and/or frequency domain link adaption can be optimized, or at least improved. In other words the radio network node can more freely use time-frequency domain scheduling e.g. allocate a set of time-frequency resources which have best radio conditions. In medium to high load cases (e.g. 40-60% radio resource usage in a cell), time and/or frequency interference mitigation schemes as described in e.g. sections 1.1. and 1.2 should be enabled to improve overall system performance.

Example 2: Selection of Scheme Based on Radio Channel Characteristics

In this example, whether or not to use a certain resource allocation scheme (e.g. as disclosed in sections 1.1-3.1) can be determined based on the radio channel characteristics of the radio environment in which the serving radio network node and UE operate. More specifically, the selection of a scheme can be based on the level of the frequency selectivity of the radio channel. In a very frequency selective radio channel the channel bandwidth of the assigned bandwidth (e.g. bandwidth of sub-band) is larger than the coherence bandwidth of the radio channel. Above the coherence bandwidth the channel characteristics don't change. According to this example, in a very frequency selective radio environment, there can be large radio quality difference between different set of radio resources e.g. between sub-bands or even between different RBs within the channel bandwidth of the cell operated by the serving radio network node of the UE. Therefore when the frequency selectivity of a channel is very significant (i.e. not within an acceptable level predefined by a threshold values) the frequency domain interference mitigation scheme (see section 2.1) can be enabled but the time domain interference mitigation (see section 1.1) can be disabled. For example, it can be determined that he frequency selectivity of a channel should not be considered within an acceptable level if the difference between the radio qualities of the best sub-band and of the sub-band candidate(s) used for scheduling UEs exceeds a predetermined threshold. On the other hand, when the frequency selectivity is not severe (i.e. is within an acceptable level) then the time domain interference mitigation (see section 1.1.) is used to improve the performance as it may mitigate inter-cell interference. In this case, the radio network node (e.g. the scheduler thereof) should use all the frequency resources (e.g. PRBs) in the flexible subframe (i.e. all resources in time domain) with higher priority first when there is data to be transmitted in UL or DL to pursue the inter-cell interference mitigation gain. The frequency selectivity of a channel is considered within an acceptable level if the difference between the radio qualities of the best sub-band and of the worst sub-band candidate(s) used for scheduling UEs is lower than another predetermined threshold.

In the above examples the radio qualities of the best sub-band (or of any frequency resource such as PRB, sub-carrier etc) can be determined by the radio network node based on UE and/or radio network node radio measurements. Examples of UE measurements and network node measurements are CSI measurement reports and SNR/SINR respectively.

4.1.2 Signaling Information Relating to Selected Resource Allocation Scheme to Other Radio Network Nodes According to one of its aspect of technology, the radio network node using a particular scheme for interference mitigation (i.e. any of the ones in sections 1.1-3.1) used for one or more flexible subframe can be signaled to other radio network nodes. Examples of other network nodes are neighboring RBS, neighboring radio network nodes (e.g. eNB, relay etc), O&M, OSS, SON, MDT nodes etc.

A radio network node may use the same scheme or even different schemes for resource allocation to users in different flexible subframes in a radio frame. For example, the same network node may use time-domain resource assignment (see section 1.1) in subframe #3 and frequency-domain resource assignment (see section 2.1) in subframe #8 (see table 1). In this case the radio network node may signal, i.e. transmit, the information about the scheme used in each flexible subframe or only for a flexible subframe where interference condition is more severe (e.g. radio quality worse than a threshold).

A receiving radio network node (e.g. RBS, eNB, etc) may use the received information to adapt one or more radio operational parameters related to radio signal transmissions e.g. transmit power, transmit format of signals (modulation, coding, transport block size) etc. The adaptation can be done to maintain the interference towards the neighboring cells within a limit. For example, if method in section 3.1 (where interference vulnerable UEs are prioritized in flexible subframe) is used in a first cell, then a second cell (neighboring cell to the first cell) may use a power level below a threshold in UL and/or DL. This may ensure that the quality of the signals received by and/or received from the interference vulnerable UEs are not degraded or at least not significantly degraded.

The receiving node (e.g. SON, OSS, O&M etc) may also use the received information, e.g., to collect statistics and use the statistics for radio network management tasks. Examples of such tasks may include: tuning of radio operational parameters (e.g. transmit power etc), recommendation for upgrading of radio network nodes (e.g. use of enhanced receiver capable of mitigating inter-cell interference), determining optimum number and/or location of radio network nodes to enhance system performance etc. For example if the received information reveals that large number of users are required to be served in flexible subframe with higher probability in one or plurality of cells then the network node may change the TDD configuration. More specifically it may increase the number of flexible subframes in one or more cells.

Example benefits of the various aspects of the technology described with respect to sections 1.1 through 4.1 include but are not limited to:

- Improved UL and/or DL performance of the flexible subframes, e.g. when employing Dynamic TDD in a radio communication network.
- Little or no added implementation complexity.
- The overall performance may be improved, since the radio network nodes may adapt the resource allocation depending on e.g. interference situation in a cell, load situation in a cell, etc.

Figure 5:
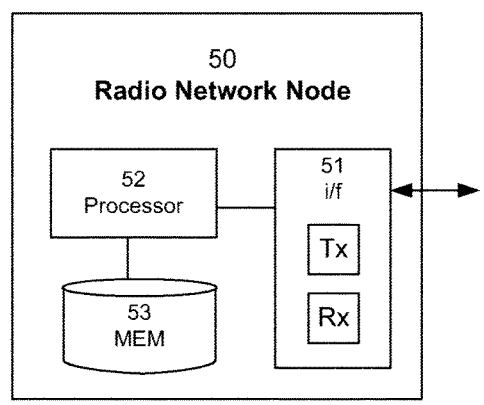
FIG. 5 shows an example implementation of a radio network node.

With reference to FIG. 5, a non-limiting example implementation of a radio network node 50 will now be briefly described. The radio network node may e.g. be exemplified as an evolved eNB. Therefore, the radio network node will be exemplified as an eNB in the following description. The eNB 50 may be configured to perform the methods, or procedures, disclosed throughout this disclosure.

In the illustrated embodiment, the eNB 50 comprises an interface module 51, a controlling module 52 (e.g. a processor), and a storage module 53 (e.g. a memory). The interface module 51 may comprise a transmitting module (Tx), or transmitter. The interface module 51 may also comprise a receiving module (Rx), or receiver. Alternatively, the interface module 51 may comprise a transceiving module (Tx/Rx), or transceiver, with both transmission and reception capabilities.

In one example embodiment, a memory 53 stores computer program code which, when run in a processor 52 causes the eNB 50 to determine a TDD configuration, wherein the TDD configuration comprises one or more subframes preconfigured as downlink subframes, one or more subframes preconfigured as uplink subframes, and one or more flexible subframes each preconfigured to be dynamically allocated either as an uplink subframe or as a downlink subframe; to furthermore determine, for each flexible subframe, an allocation priority and/or allocation probability of using the flexible subframe as an uplink subframe or as a downlink subframe; and to furthermore allocate resources to one or more UEs based on the determined allocation priority and/or allocation probability.

Advantageously, the allocation priority in the same flexible subframe may be complementary in that a flexible subframe with higher allocation priority of downlink transmission has lower allocation priority of uplink transmission and vice versa. Additionally, or alternatively, the allocation probability in the same flexible subframe may be complementary in that a flexible subframe with higher allocation probability of downlink transmission has lower allocation probability of uplink transmission and vice versa.

In some embodiments, the memory 53 and the computer program code may be configured to, with the processor 52, cause the eNB 50 to: assign resources to the at least one UE in the flexible subframe based on the determined allocation priority and/or allocation probability; and signal (i.e. transmit) information about the assigned resources to the one or more UEs. In other words, the eNB 50 may be configured to transmit a signal, to the one or more UEs, comprising an information element (or, a message) including information about the assigned resources. In some embodiments, the memory 53 and the computer program code may be configured to, with the processor 52, cause the eNB 50 to: assign resources to the at least one UE in the flexible subframe based on the determined allocation priority and/or allocation probability; and signal the determined allocation priority and/or allocation probability to the one or more UEs. In other words, the eNB 50 may be configured to transmit a signal, to the one or more UEs, comprising an information element (or, a message) including information about the determined allocation priority and/or allocation probability.

In some embodiments, the memory 53 and the computer program code may be configured to, with the processor 52, cause the eNB 50 to: determine the allocation priority and/or allocation probability of using each resource block in the flexible subframe for uplink or downlink transmission, and assign the allocation priority and/or allocation probability for scheduling one or more resource blocks in each flexible subframe.

Optionally, the memory 53 and the computer program code may also be configured to, with the processor 52, cause the eNB 50 to signal (using the communication interface 51) to one or more UEs the determined allocation priority and/or allocation probability of using each resource block in the flexible subframe for uplink or downlink transmission. Thus, the eNB 50 may transmit a signal (using the communication interface 51) comprising an information element (or a message) including information about the determined allocation priority and/or allocation probability of using each resource block in the flexible subframe for uplink or downlink transmission. Additionally, or alternatively, the memory 53 and the computer program code may also be configured to, with the processor 52, cause the eNB 50 to signal (using the communication interface 51) to the at least one UE the assigned allocation priority and/or allocation probability for scheduling the one or more resource blocks in each flexible subframe. Thus, the eNB 50 may transmit a signal (using the communication interface 51) comprising an information element (or a message) including information about the assigned allocation priority and/or allocation probability for scheduling the one or more resource blocks in each flexible subframe.

Also, the memory 53 and the computer program code may be configured to, with the processor 52, cause the eNB 50 to determine the allocation priority based on one or several of the following criteria: a determined traffic load, a determined signal quality, a determined traffic demand, a determined proportion of traffic direction, a determined service type, a determined earlier-assigned allocation priority and/or probability, a determined allocation priority and/or probability in one or more neighboring radio cells. Additionally, or alternatively, memory 53 and the computer program code may be configured to, with the processor 52, cause the eNB 50 to determine the allocation probability based on one or several of the following criteria: a determined traffic load, a determined signal quality, a determined traffic demand, a determined proportion of traffic direction, a determined service type, a determined earlier-assigned allocation priority and/or probability, a determined allocation priority and/or probability in one or more neighboring radio cells.

Moreover, the memory 53 and the computer program code may be configured to, with the processor 52, cause the radio network node to assign an allocation priority to the same flexible subframe in one or more neighboring cells. Additionally, or alternatively, the memory 53 and the computer program code may be configured to, with the processor 52, cause the radio network node to assign an allocation probability to the same flexible subframe in one or more neighboring cells.

Still further, the memory 53 and the computer program code may be configured to, with the processor 52, cause the eNB 50 to allocate the one or more flexible subframes (or, alternatively one or more resource blocks in the flexible subframes) which are assigned allocation priority and/or allocation probability above a pre-defined threshold, to at least one UE experiencing interference above a predefined interference threshold. Alternatively, the memory 53 and the computer program code may be configured to, with the processor 52, cause the eNB 50 to allocate the one or more flexible subframes (or, alternatively, one or more resource blocks in the flexible subframes) which are assigned allocation priority and/or allocation probability above a pre-defined threshold, to at least one UE experiencing signal quality below a predefined signal quality threshold.

Furthermore, the memory 53 and the computer program code may be configured to, with the processor 52, cause the eNB 50 to exchange (communicating, by using the communication interface 51) with one or several other radio network nodes, information about the determined allocation priority and/or allocation probability using the flexible subframe as an uplink subframe or as a downlink subframe. In other words, the eNB 50 may be configured to communicate signals comprising information elements (or messages) including information about the determined allocation priority and/or allocation probability using the flexible subframe as an uplink subframe or as a downlink subframe.

Figure 6:
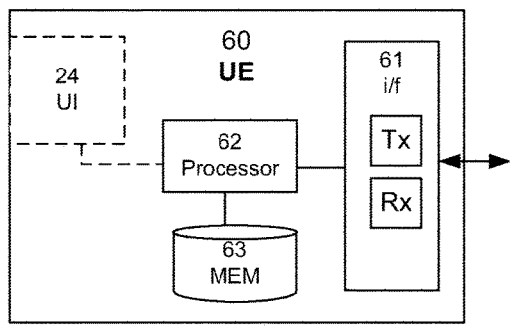
FIG. 6 shows an example implementation of a user equipment.

With reference to FIG. 6, a non-limiting example implementation of a UE 60 will now be briefly described. The UE 60 may be configured to perform the methods, or procedures, disclosed throughout this disclosure.

In the illustrated embodiment, the UE 60 comprises an interface module 61, a controlling module 62 (e.g. a processor), and a storage module 63 (e.g. a memory). The interface module 61 may comprise a transmitting module (Tx), or transmitter. The interface module 61 may also comprise a receiving module (Rx), or receiver. Alternatively, the interface module 61 may comprise a transceiving module (Tx/Rx), or transceiver, with both transmission and reception capabilities. Also, the UE 60 may comprise a user interface (UI) through which a user can operate and interact with the UE 60.

In one example embodiment, the communication interface 61 (e.g. a receiver) is configured to receive, from a radio network node (e.g. eNB), information about a determined allocation priority and/or probability. For example, a memory 63 may store computer program code which, when run in a processor 62 causes the UE 60 to enable reception, e.g. via a receiver 61, information about a determined allocation priority and/or probability. Thus, the UE 60 may be configured to receive a signal comprising an information element (or, a message) including information about a determined allocation priority and/or probability. Additionally, or alternatively, the communication interface 61 (e.g. a receiver) may be configured to receive, from a radio network node, information about assigned resources. For instance, a memory 63 may store computer program code which, when run in a processor 62 causes the UE 60 to enable reception, e.g. via a receiver 61, information about the assigned resources. Hence, the UE 60 may be configured to receive a signal comprising an information element (or, a message) including information about assigned resources.

The communication interface 61 (e.g. a receiver) may also be configured to receive, from the radio network node, a determined allocation priority and/or allocation probability of using each resource block in a flexible subframe for uplink or downlink transmission. For example, a memory 63 may store computer program code which, when run in a processor 62 causes the UE 60 to enable reception, e.g. via a receiver 61, of information about a determined allocation priority and/or allocation probability of using each resource block in a flexible subframe for uplink or downlink transmission. Hence, the UE 60 may be configured to receive a signal comprising an information element (or, a message) including information about a determined allocation priority and/or allocation probability of using each resource block in a flexible subframe for uplink or downlink transmission. Additionally, or alternatively, the communication interface 61 (e.g. a receiver) may be configure to receive, from the radio network node, the assigned allocation priority and/or allocation probability for scheduling the one or more resource blocks in each flexible subframe. For instance, a memory 63 may store computer program code which, when run in a processor 62 causes the UE 60 to enable reception, e.g. via a receiver 61, of information about the assigned allocation priority and/or allocation probability for scheduling the one or more resource blocks in each flexible subframe. Thus, the UE 60 may be configured to receive a signal comprising an information element (or, a message) including information about the assigned allocation priority and/or allocation probability for scheduling the one or more resource blocks in each flexible subframe.

The processor 62 may further be configured to process received signals. Moreover, the memory 63 may also store computer program code which, when run in a processor 62 causes the UE 60 to interpret information included in information elements (or, messages) of received signals.

Exampled benefits for allocating resources to UE(s) based on a determined allocation priority and/or allocation probability as disclosed in some embodiments herein include e.g. improved resource allocation in radio communication networks, such as those using TDD (e.g. Dynamic TDD). Flexible subframes may allow a rapid change of the DL/UL asymmetry to meet varying traffic conditions in the radio communication network. Also, the allocation of resources on the basis of a determined allocation priority and/or allocation probability according some of the embodiments disclosed herein may allow for mitigating, alleviating, or reducing inter-cell interference. Therefore, some embodiments disclosed herein can allow for an overall performance improvement of radio communication networks. Consequently, the herein described various embodiments of technology may be particularly appealing in heterogeneous communication networks.

Although the present technology has been described above with reference to specific embodiments, it is not intended to be limited to the specific form set forth herein. For example, the embodiments presented herein are not limited to the existing TDD configuration; rather they are equally applicable to new TDD configurations defined in future. The technology is limited only by the accompanying claims and other embodiments than the specific above are equally possible within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The invention claimed is:

1. A method performed by a radio network node, the method comprising:
   determining a time division duplex, TDD, configuration, wherein the TDD configuration comprises one or more subframes preconfigured as downlink subframes, one or more subframes preconfigured as uplink subframes, and one or more flexible subframes each preconfigured to be dynamically allocated either as an uplink subframe or as a downlink subframe;
   determining, for each flexible subframe, an allocation priority and/or allocation probability of using the flexible subframe as an uplink subframe or as a downlink subframe, wherein determining the allocation priority and/or allocation probability comprises:
      determining the allocation priority and/or allocation probability of using each resource block in the flexible subframe for uplink or downlink transmission; and
      assigning the allocation priority and/or allocation probability for scheduling one or more resource blocks in each flexible subframe; and
   allocating resources to at least one user equipment, UE, based on the determined allocation priority and/or allocation probability, wherein allocating the resources to the at least a one UE comprises:
      assigning resources to the at least one UE in the flexible subframe based on the determined allocation priority and/or allocation probability; and
      signalling to the UE the determined allocation priority and/or allocation probability.

2. The method according to claim 1, further comprising signaling to the at least one UE the determined allocation priority and/or probability of using each resource block in the flexible subframe for uplink or downlink transmission and/or the assigned allocation priority and/or allocation probability for scheduling the one or more resource blocks in each flexible subframe.

3. The method according to claim 1, wherein determining the allocation priority and/or allocation probability is based on one or several of the following criteria: a determined traffic load, a determined signal quality, a determined traffic demand, a determined proportion of traffic direction, a determined service type, a determined earlier-assigned allocation priority and/or allocation probability, a determined allocation priority and/or allocation probability in one or more neighboring radio cells.

4. The method according to claim 1, further comprising: assigning an allocation priority and/or probability to the same flexible subframe in one or more neighboring cells.

5. The method according to claim 1, comprising: allocating the one or more flexible subframes or one or more resource blocks in the flexible subframes which are assigned allocation priority and/or allocation probability above a pre-defined threshold, to at least one UE experiencing interference above a predefined interference threshold or experiencing signal quality below a predefined signal quality threshold.

6. The method according to claim 1, wherein the allocation priority and/or allocation probability in the same flexible subframe is complementary in that a flexible subframe with higher allocation probability/priority of downlink transmission has lower allocation probability/priority of uplink transmission and vice versa.

7. The method according to claim 1, comprising: exchanging, with one or several other radio network nodes, information about the determined allocation priority and/or allocation probability of using the flexible subframe as an uplink subframe or as a downlink subframe.

8. A method performed by a user equipment, UE, the method comprising:
   receiving, from a radio network node, information about a determined allocation priority and/or probability of using each resource block in a flexible subframe as an uplink subframe or as a downlink subframe, wherein resources are allocated to the UE in the flexible subframe based on the determined allocation priority and/or probability; and
   using the determined allocation priority and/or probability for an uplink or downlink transmission.

9. The method according to claim 8, comprising:
   receiving, from the radio network node, a determined allocation priority and/or allocation probability of using each resource block in a flexible subframe for uplink or downlink transmission and/or the assigned allocation priority and/or allocation probability for scheduling the one or more resource blocks in each flexible subframe.

10. A radio network node, comprising:
    a communication interface configured for wireless communication;

a processor; and a memory storing computer program code which, when run in the processor causes the radio network node to:

determine a time division duplex, TDD, configuration, wherein the TDD configuration comprises one or more subframes preconfigured as downlink subframes, one or more subframes preconfigured as uplink subframes, and one or more flexible subframes each preconfigured to be dynamically allocated either as an uplink subframe or as a downlink subframe;

determine, for each flexible subframe, an allocation priority and/or allocation probability of using the flexible subframe as an uplink subframe or as a downlink subframe, wherein determining the allocation priority and/or allocation probability comprises:

determining the allocation priority and/or allocation probability of using each resource block in the flexible subframe for uplink or downlink transmission; and assigning the allocation priority and/or allocation probability for scheduling one or more resource blocks in each flexible subframe; and allocate resources to at least one user equipment, UE, based on the determined allocation priority and/or allocation probability, wherein allocating the resources to the at least a one UE comprises:

assigning resources to the at least one UE in the flexible subframe based on the determined allocation priority and/or allocation probability; and signalling to the UE the determined allocation priority and/or allocation probability.

11. The method according to claim 10, wherein the memory and the computer program code are configured to, with the processor, cause the radio network node to signal, by means of the communication interface, to the at least one UE the determined allocation priority and/or probability of using each resource block in the flexible subframe for uplink or downlink transmission and/or the assigned allocation priority and/or allocation priority and/or probability for scheduling the one or more resource blocks in each flexible subframe.

12. The radio network node according to claim 10, wherein the memory and the computer program code are configured to, with the processor, cause the radio network node to determine the allocation priority and/or allocation probability based on one or several of the following criteria: a determined traffic load, a determined signal quality, a determined traffic demand, a determined proportion of traffic direction, a determined service type, a determined earlier-assigned allocation priority and/or probability, a determined allocation priority and/or probability in one or more neighboring radio cells.

13. The radio network node according to claim 10, wherein the memory and the computer program code are configured to, with the processor, cause the radio network node to assign an allocation priority and/or allocation probability to the same flexible subframe in one or more neighboring cells.

14. The radio network node according to claim 10, wherein the memory and the computer program code are configured to, with the processor, cause the radio network node to allocate the one or more flexible subframes or one or more resource blocks in the flexible subframes which are assigned allocation priority and/or allocation probability above a pre-defined threshold, to at least one UE experiencing interference above a predefined interference threshold or experiencing signal quality below a predefined signal quality threshold.

15. A user equipment, UE, comprising:

a memory for storing instructions; and a processor configured to execute the instructions to cause the processor to:

receive, from a radio network node, information about a determined allocation priority and/or probability of using each resource block in a flexible subframe as an uplink subframe or as a downlink subframe, wherein resources are allocated to the UE in the flexible subframe based on the determined allocation priority and/or probability; and use the determined allocation priority and/or probability for an uplink or downlink transmission.

16. The UE according to claim 15, wherein the communication interface is configured to receive, from the radio network node, a determined allocation priority and/or allocation probability of using each resource block in a flexible subframe for uplink or downlink transmission and/or the assigned allocation priority and/or allocation probability for scheduling the one or more resource blocks in each flexible subframe.

* * * * *